(12) United States Patent
Bowen

(10) Patent No.: US 6,427,549 B1
(45) Date of Patent: Aug. 6, 2002

(54) DUAL COUNTERSHAFT TWIN CLUTCH AUTOMATED TRANSMISSION

(75) Inventor: Thomas C. Bowen, Rochester Hills, MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 09/757,805

(22) Filed: Jan. 10, 2001

(51) Int. Cl.[7] ................................................. F16H 3/08
(52) U.S. Cl. .......................................... 74/331; 74/333
(58) Field of Search .......................... 74/331, 335, 339, 74/333

(56) References Cited

U.S. PATENT DOCUMENTS

| | | | |
|---|---|---|---|
| 4,640,145 A | * | 2/1987 | Vandervoort ................ 74/331 |
| 4,719,819 A | * | 1/1988 | Tsutsumikoshi et al. ...... 74/331 |
| 4,805,473 A | * | 2/1989 | Bower .......................... 74/331 |
| 5,218,885 A | * | 6/1993 | Nakano et al. ............... 74/331 |
| 5,508,574 A | * | 4/1996 | Vlock ......................... 310/113 |
| 5,890,392 A | * | 4/1999 | Ludanek et al. .............. 74/331 |
| 5,943,911 A | | 8/1999 | Beckerman |
| 5,966,989 A | | 10/1999 | Reed, Jr. et al. |
| 6,209,406 B1 | | 4/2001 | Sperber et al. |
| 6,209,407 B1 | * | 4/2001 | Heinzel et al. ............... 74/331 |
| 6,307,276 B1 | * | 10/2001 | Bader ........................ 180/65.2 |

* cited by examiner

Primary Examiner—Paul N. Dickson
Assistant Examiner—Robert A. Siconolfi
(74) Attorney, Agent, or Firm—Harness, Dickey & Pierce, P.L.C.

(57) ABSTRACT

An automated twin-clutch multi-speed transmission is disclosed which functions to transfer power from the engine to one or more drivelines of a motor vehicle. The transmission includes a first engine clutch operable to establish a releasable drive connection between the engine and a first input shaft, a first motor/generator connected to the first input shaft, a second engine clutch operable to establish a releasable drive connection between the engine and a second input shaft, a second motor/generator connected to the second input shaft, an output shaft adapted to transfer power to the driveline, and a geartrain for selectively establishing a plurality of forward and reverse speed ratio drive connections between the input shafts and the output shaft. The transmission further includes power-operated dog clutches for selectively engaging constant-mesh gearsets associated with the geartrain, and a transmission controller for controlling coordinated actuation of the first and second engine clutches, the first and second motor/generators, and the power-operated dog clutches to permit non-power interrupted ("powershift") sequential gear changes automatically without input from the vehicle operator. The motor/generators are used to establish speed synchronization during the gear change process.

17 Claims, 2 Drawing Sheets

DUAL COUNTERSHAFT TWIN CLUTCH AUTOMATED TRANSMISSION

FIELD OF THE INVENTION

The present invention relates generally to transmissions for use in motor vehicles and, more particularly, to a twin-clutch automated transmission applicable for use in rear-wheel drive vehicles.

BACKGROUND OF THE INVENTION

Automobile manufacturers continuously strive to improve fuel efficiency. This effort to improve fuel efficiency, however, is typically offset by the need to provide enhanced comfort and convenience to the vehicle operator. For example, it is well known that manual transmissions are more fuel efficient than automatic transmissions, yet a majority of all passenger vehicles are equipped with automatic transmissions due to the increased convenience they provide.

More recently, "automated" variants of conventional manual transmissions have been developed which shift automatically without any input from the vehicle operator. Such automated transmissions typically include a plurality of power-operated actuators that are controlled by a transmission controller to shift traditional synchronized dog clutches. However, such automated transmissions have the disadvantage that there is a power interruption in the drive connection between the input shaft and the output shaft during sequential gear shifting. Power interrupted shifting results in a harsh shift feel which is generally considered to be unacceptable when compared to smooth shift feel associated with most automatic transmissions. To overcome this problem, automated twin-clutch transmissions have been developed which can be powershifted to permit gearshifts to be made under load. Examples of such automated manual transmissions are shown in U.S. Pat. Nos. 5,966,989 and 5,890,392. While such powershift twin-clutch transmissions overcome several drawbacks associated with conventional single-clutch automated transmissions, a need exists to develop simpler and more robust transmissions which advance the automotive transmission technology.

SUMMARY OF THE INVENTION

Accordingly, it is an object of the present invention to provide a dual-countershaft twin-clutch transmission and a control system for permitting automatic shifting of transmission.

As a related object, the twin-clutch automated transmission of the present invention has a compact geartrain and is applicable for use in rear-wheel drive vehicles.

These and other objects of the present invention are met by providing an automated dual-countershaft twin-clutch multi-speed transmission adapted to transfer power from the engine to a driveline of a motor vehicle. The transmission includes a first master clutch operable to establish a releasable drive connection between the input shaft and a first countershaft, a first motor/generator connected to the first countershaft, a second master clutch operable to establish a releasable drive connection between the input shaft and a second countershaft, a second motor/generator connected to the second countershaft, an output shaft adapted to transfer power to the driveline, and a geartrain for selectively establishing a plurality of forward and reverse speed ratio drive connections between the countershafts and the output shaft. The transmission further includes power-operated dog clutches for selectively engaging constant-mesh gearsets associated with the geartrain, and a transmission controller for controlling coordinated actuation of the first and second master clutches, the first and second motor/generator, and the power-operated dog clutches to permit non-power interrupted ("powershift") sequential gear changes automatically without input from the vehicle operator. When shifting under power between gear ratios, one master clutch is released and the corresponding motor/generator is actuated to accelerate/decelerate the released countershaft into speed synchronization with the output shaft. Following completion of speed synchronization, the dog clutch for the selected gearset on the released countershaft is actuated and thereafter the released master clutch is re-engaged.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the scope of this invention will become apparent to those skilled in the art.

DETAILED DESCRIPTION OF THE PREFERRED EMBODIMENTS

Figure 1:
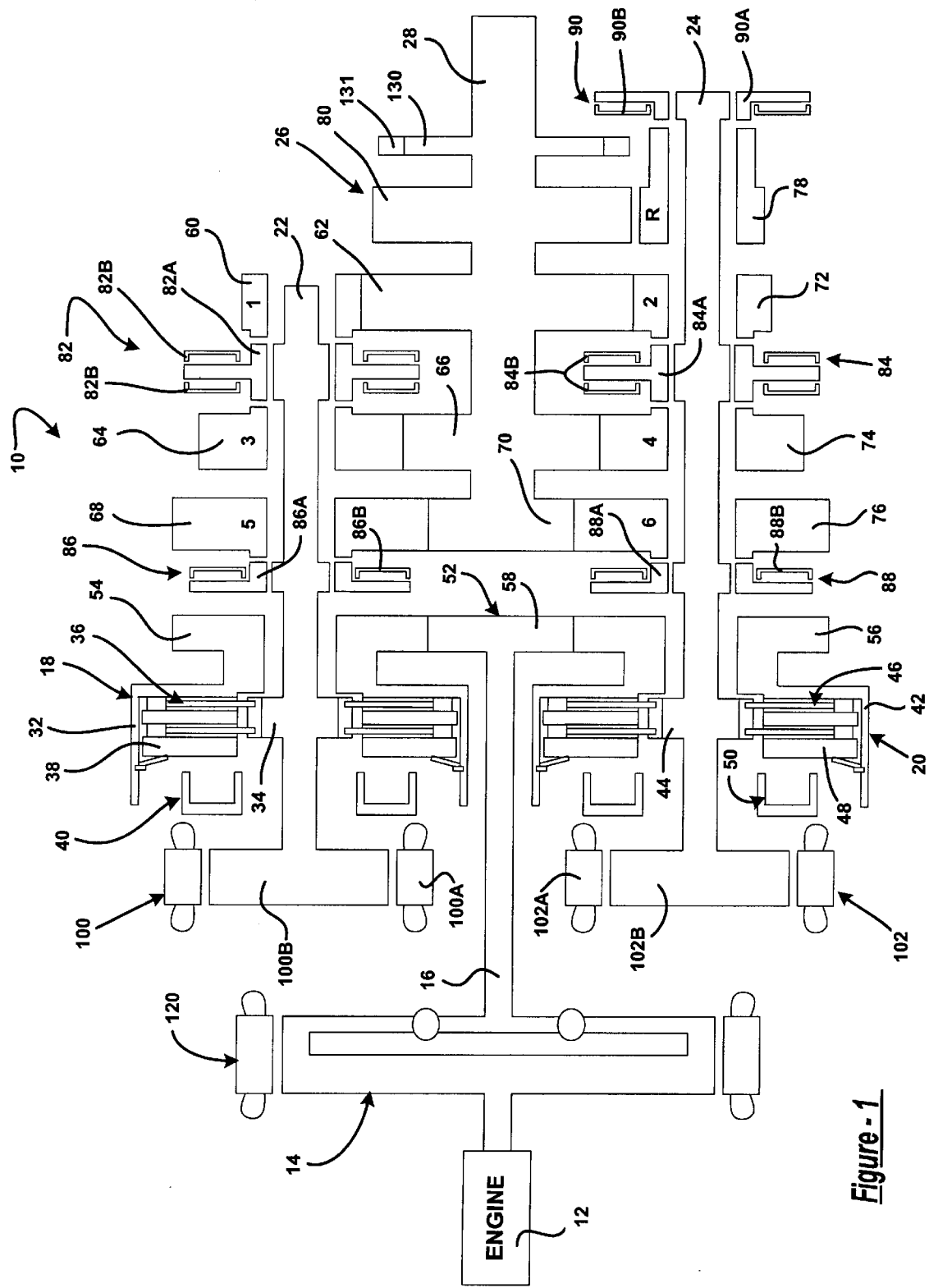
FIG. 1 is a schematic view of a dual-countershaft twin-clutch automated transmission according to the principles of the present invention.
Figure 2:
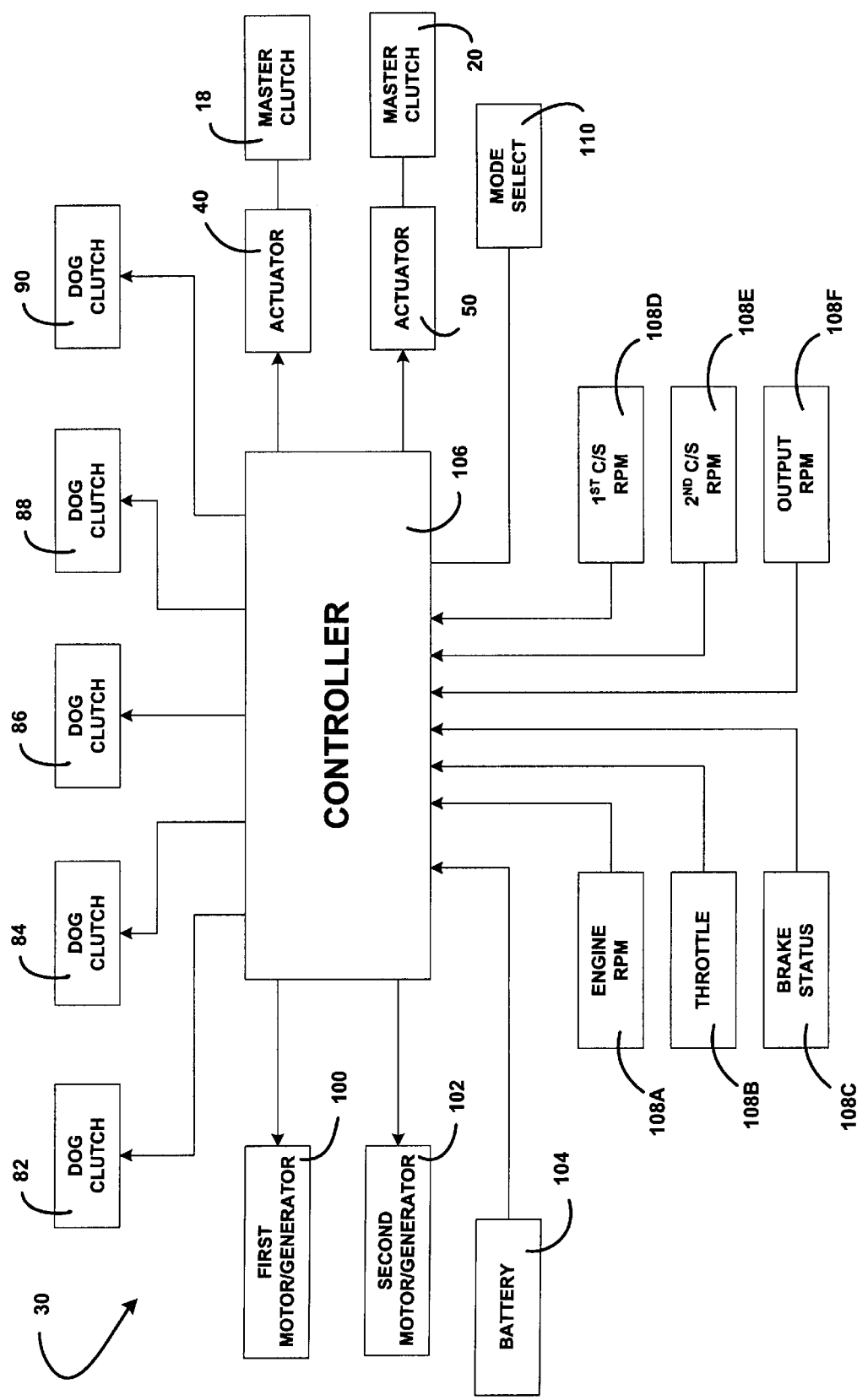
FIG. 2 is a diagrammatical illustration of the transmission control system adapted for use with the twin-clutch automated transmission shown in FIG. 1.

With reference to FIGS. 1 and 2 of the accompanying drawings, a twin-clutch automated transmission 10 will now be described. Transmission 10 is driven by the output of an engine 12 and generally includes a flywheel damper unit 14, an input shaft 16, a first master clutch 18, a second master clutch 20, a first countershaft 22, a second countershaft 24, a geartrain 26, an output shaft 28, and a shift control system 30.

First master clutch 18 is a power-operated spring-apply plate-type clutch which is normally operable in its engaged state to establish a drive connection between input shaft 16 and first countershaft 22. Likewise, second master clutch 20 is a power-operated spring-apply plate-type clutch normally operable in its engaged state to establish a drive connection between input shaft 16 and second countershaft 24. First master clutch 18 includes a clutch drum 32, a hub 34 fixed to first countershaft 22, a clutch pack 36 disposed between drum 32 and hub 34, a spring-biased apply plate 38 acting on clutch pack 36, and an actuator 40 for selectively releasing apply plate 38 from engagement with clutch pack 36. Preferably, actuator 40 is an electrically-actuated device, such as an electromagnetic solenoid, that controls the position of apply plate 38, and thus the magnitude of engagement of first master clutch 18, in response to electric power being provided thereto.

Second master clutch 20 includes a clutch drum 42, a hub 44 fixed to second countershaft 24, a clutch pack 46 disposed between drum 42 and hub 44, a spring-biased apply plate 48 acting on clutch pack 46, and an actuator 50 for selectively releasing apply plate 48 from engagement with clutch pack 46. Actuator 50 is an electrically-actuated device that controls the position of apply plate 48, and thus the magnitude of engagement of second master clutch 20, in response to the electric power provided thereto. As will be detailed, shift control system 30 is operable to control actuators 40 and 50 and, in turn, the engagement and release of master clutches 18 and 20.

Geartrain 26 includes a headset 52 for transferring drive torque from input shaft 16 to master clutches 18 and 20. In particular, headset 52 includes a first transfer gear 54 rotatably supported on first countershaft 22, a second transfer gear 56 rotatably supported on second countershaft 24, and an input gear 58 fixed for rotation with input shaft 16 which is in meshed engagement with first transfer gear 54 and second transfer gear 56. As seen, first transfer gear 54 is fixed to clutch drum 32 for delivering engine power to first engine clutch 18 while second transfer gear 56 is fixed to clutch drum 42 for delivering engine power to second engine clutch 20. Gearset 26 also includes a first set of speed gears rotatably supported on first countershaft 22 and a second set of speed gears rotatably supported on second countershaft 24, both of which are in constant mesh with a set of output gears fixed to output shaft 28. The first set of speed gears include a first speed gear 60 which is meshed with a first output gear 62, a third speed gear 64 which is meshed with a second output gear 66, and a fifth speed gear 68 which is meshed with a third output gear 70. Similarly, the second set of speed gears includes a second speed gear 72 which is meshed with first output gear 62, a fourth speed gear 74 which is meshed with second output gear 66, and a sixth speed gear 76 which is meshed with third output gear 70. Geartrain 22 also includes a reverse gearset having a reverse input gear 78 rotatably supported on second countershaft 24, a reverse output gear 80 fixed to output shaft 28, and a reverse idler gear (not shown) meshed with reverse input gear 78 and reverse output gear 80.

Shift control system 30 includes a plurality of power-operated shift clutches which are operable for selectively coupling a selected speed gear to its corresponding countershaft for establishing six forward and one reverse speed ratio drive connections with output shaft 28. Preferably, these shift clutches are electrically-actuated dog clutches. In particular, a first dog clutch 82 is operable for selectively coupling/releasing first speed gear 60 and third, speed gear 64 to/from first countershaft 22, a second dog clutch 84 is operable for selectively coupling/releasing second speed gear 72 and fourth speed gear 74 to/from second countershaft 24, and a third dog clutch 86 operable for selectively coupling/releasing fifth speed gear 68 to first countershaft 22. Shift control system 30 also include a fourth dog clutch 88 that is operable for selectively coupling/releasing sixth speed gear 76 to/from second countershaft 24, and a fifth dog clutch 90 operable for selectively coupling/releasing reverse input gear 78 to/from second countershaft 24. Each dog clutch includes a sliding sleeve (denoted by the suffix "A") which is splined for rotation with and axial movement on a clutch hub which, in turn, is fixed to a corresponding one of countershafts 22 and 24. As is conventional, axial movement of the sliding sleeves from the neutral uncoupled positions shown results in clutched engagement with the adjacent speed gear. Preferably, each dog clutch is of the electromagnetic type having a coil (denoted by suffix "B") adjacent to and facing a radial armature plate segment of each sliding sleeve. Electrical power delivered to the electromagnetic coils causes controlled axial movement of the shift sleeves. Since first clutch 82 and second clutch 84 are of the double-acting variety, a pair of coils are provided therewith. It is to be understood that any other type of power-operated device capable of moving each sliding sleeve between its uncoupled and coupled positions is within the scope of this invention.

Shift control system 30 further includes a first motor/generator 100 operably connected to first countershaft 22, a second motor/generator 102 operably connected to second countershaft 24, a battery 104, a transmission controller 106, and vehicle sensors 108. First motor/generator 100 includes a fixed stator 100A and a rotor 100B that is fixed for rotation with first countershaft 22. Likewise, second motor/generator 102 includes a fixed stator 102A and a rotor 102B that is fixed for rotation with second countershaft 24. Controller 106 is an electronically-controlled unit capable of receiving data from vehicle sensors 108 and generating electric output signals in response to the sensor signals. Sensors 108 include engine speed 108A, throttle position 108B, brake status 108C, first countershaft speed 108D, second countershaft speed 108E, and output shaft speed 108F. Controller 106 functions to manage shifting of motor/generators 100 and 102 between "drive" modes and "regeneration" modes as well as charging/discharging of battery 104. Controller 108 is also operable to coordinate and monitor actuation of all the electrically-controlled devices associated with transmission 10 to permit powershifted sequential gear changes automatically without any input from the vehicle operator.

Geartrain 26 is shown in FIG. 1 to further include a parking pawl wheel 130 that is fixed to output shaft 28 and a parking pawl 131 is operable to engage wheel 130 for releasably locking output shaft 28 to a stationary member (i.e. the housing of transmission 10) to prevent rotation of output shaft 28. Parking pawl 131 is operable to release output shaft 28 when the gearshift lever is moved out of its PARK position and lock output shaft 28 when the gearshift lever is returned to its PARK position.

If desired, a manually-operable mode selector switch 110 can be provided to shift transmission 10 from its automatic shift mode to a manual shift mode. Mode switch 110 would, when actuated, allow the vehicle operator to shift the gearshift lever manually to effect sequential gear shifts (without use of a clutch pedal). However, controller 106 would only permit the selected gearshift to be completed if the current vehicle characteristics (i.e. engine speed, vehicle speed, etc.) permit completion of the requested shift.

When it is desired to operate the vehicle, engine 12 is started with the gearshift lever in its PARK position and both master clutches 18 and 20 engaged such that both countershafts 22 and 24 are in drive connection with the output of engine 12. However, all of the electrically-actuated dog clutches are released with each shift sleeve located in its neutral uncoupled position, whereby no drive torque is delivered through geartrain 26 to output shaft 28. When the vehicle operator moves the gearshift lever from the PARK position to the DRIVE position, parking pawl 131 is released. Next, controller 106 activates first actuator 40 for releasing first master clutch 18, whereby the drive connection between input shaft 14 and first countershaft 22 is released. Controller 106 also shifts first motor/generator 100 into its regeneration mode for causing rotor 100B to retard the rotary speed of first countershaft 22 to match the rotary speed of output shaft 28. Upon completion of speed synchronization, first dog clutch 82 is actuated by controller 106 sending an electrical signal to coil 82B for moving sliding sleeve 82A into clutched engagement with first speed gear 60. As such, first speed gear 60 is coupled for rotation with first countershaft 22, whereby the first forward speed ratio drive connection is established between first countershaft 22 and output shaft 28. Controller 106 then functions to turn off first motor/generator 100 and progressively engage first master clutch 18 for coupling input shaft 16 to first countershaft 22 for accelerating the vehicle.

Thereafter, when the vehicle operating parameters indicate a need to shift transmission 10 into the second forward gear ratio, controller 106 activates second actuator 50 for releasing second master clutch 20, whereby the drive connection between driven input shaft 16 and second countershaft 24 is released. Thereafter, controller 106 shifts second motor/generator 102 into its regeneration mode for retarding the rotary speed of second countershaft 24 so as to synchronize its rotary speed to that of second speed gear 72 which is driven by output gear 62 on output shaft 28. When controller 106 determines that speed synchronization is complete, coil 84B of second dog clutch 84 is activated by controller 106 for moving sliding sleeve 84A such that second speed gear 72 is coupled to second countershaft 24. Thereafter, controller 106 turns off second motor/generator 102 and coordinates the release of first master clutch 18 and the re-engagement of second master clutch 20, thereby establishing a drive connection between input shaft 16 and second countershaft 24 which, in turn, drives output shaft 28. Once first master clutch 18 is released completely, controller 106 causes first dog clutch 82 to return sliding sleeve 82A to its neutral position for uncoupling first speed gear 60 from first countershaft 22.

As will be appreciated, this upshift process continues through each of the other forward speed gear ratios and likewise works in reverse for downshifts so as to establish six forward gear ratios. Specifically, the appropriate motor/generator is shifted into its regeneration mode during upshifts to retard the speed of the non-driven countershaft for causing speed synchronization with the geartrain 26. Likewise, the appropriate motor/generator is shifted into its drive mode during downshifts to increase the speed of the non-driven countershaft for causing speed synchronization. When the gearshift lever is shifted into its REVERSE position, fifth dog clutch 90 is actuated by controller 106 for causing sleeve 90A to move into clutched engagement with reverse input gear for driving output shaft 28 in the opposite direction. With this powershift methodology, transmission 10 shifts between master clutches in a power-on shift strategy (i.e. no power interruption). Transmission 10 is also shown to include a third motor/generator 120 associated with flywheel damper unit 14 for starting engine 12 or charging battery 104. However, if the torque capacity of motor/generators 100 and 102 is adequate to start engine 12, then third motor/generator 120 can be eliminated.

Thus, the transmission of the present invention utilize the components typically associated with a manually-shifted synchromesh transmission in combination with power-operated dog clutches and a dual-countershaft twin clutch arrangement to provide a compact powershifted automated multi-speed transmission. The use of a compact geartrain allows a desired speed gear to be pre-selected and engaged while disconnected from the engine and thereafter driven by shifting between the engine clutches. Further, the use of electrically-powered motor/generators as speed synchronizer devices to controllable retard or increase shaft speeds is novel and advances the transmission art. Moreover, the use of all electric powered actuators for the engine clutches, dog clutches and motor/generators eliminates the need for a hydraulic system and should promote a highly efficient transmission since electric power is only required for shifting.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A twin-clutch transmission for use in a motor vehicle having an engine and a driveline, comprising:
   an input shaft driven by the engine;
   an output shaft adapted for connection to the driveline and having an output gear fixed thereto;
   a first countershaft rotatably supporting a first speed gear meshed with said output gear;
   a first master clutch operable for establishing a releasable drive connection between said input shaft and said first countershaft;
   a first shift clutch operable for releaseably coupling said first speed gear to said first countershaft to establish a drive connection between said first countershaft and said output shaft;
   a second countershaft rotatably supporting a second speed gear meshed with said output gear;
   a second master clutch operable for establishing a releasable drive connection between said input shaft and said second countershaft;
   a second shift clutch operable for releasably coupling said second speed gear to said second countershaft to establish a drive connection between said second countershaft and said output shaft;
   a first motor/generator connected to said first countershaft;
   a second motor/generator connected to said second countershaft; and
   a controller for controlling actuation of said first and second motor/generators.

2. The twin-clutch transmission of claim 1 further comprising:
   a first electric actuator controlling actuation of said first master clutch; and
   a second electric actuator controlling actuation of said second master clutch;
   wherein said controller controls actuation of said first and second electric actuators.

3. The twin-clutch transmission of claim 2 wherein said first and second shift clutchs are electrically-actuated dog clutches controlled by said controller.

4. The twin-clutch transmission of claim 1 wherein first motor/generator has a first rotor adapted to drive or be driven by said first countershaft, said second motor/generator has a second rotor adapted to drive or be driven by said second countershaft, whereby when said first countershaft is released from driven connection with said input shaft and said first shift clutch is disengaged, said first motor/generator is actuated to synchronize the rotary speed of said first countershaft to that of said first speed gear driven by said output gear.

5. The twin-clutch transmission of claim 1 further comprising:
   a second output gear fixed to said output shaft;
   a third speed gear rotatably supported on said first countershaft and meshed with said second output gear; and
   a fourth speed gear rotatably supported on said second countershaft and meshed with said second output gear;
   wherein said first shift clutch is operable for releasably coupling said third speed gear to said first countershaft, and said second shift clutch is operable for releasably coupling said fourth speed gear to said second countershaft.

6. The twin-clutch transmission of claim 1 wherein said first and second master clutches and said first and second shift clutches are electrically-actuated devices controlled by said controller for automatically shifting between a first gear ratio established by said first speed gear and a second gear ratio established by said second speed gear.

7. The twin-clutch transmission of claim 6 wherein said first and second shift clutches are electrically-actuated dog clutches.

8. The twin-clutch transmission of claim 2 wherein said first master clutch includes a drum driven by said input shaft and rotatably supported on said first countershaft, a hub fixed to said first countershaft, a clutch pack disposed between said drum and said hub, and a spring-biased apply plate normally exerting a clutch engagement force on said clutch pack for frictionally coupling said hub for rotation with said drum, and wherein said first electric actuator is operable to release said apply plate from engagement with said clutch pack.

9. The twin-clutch transmission of claim 8 further comprising a drive gear fixed to said input shaft which is meshed with a transfer gear fixed to said drum.

10. A twin-clutch transmission for use in a motor vehicle having an engine and a driveline, comprising:
an input shaft adapted for connection to the engine;
an output shaft adapted for connection to the driveline;
a first countershaft;
a second countershaft;
a first master clutch operable for establishing a releasable drive connection between said input shaft and said first countershaft;
a second master clutch operable for establishing a releasable drive connection between said input shaft and said second countershaft;
a geartrain including first and second output gears fixed to said output shaft, a first speed gear supported on said first countershaft and meshed with said first output gear, a second speed gear supported on said second countershaft and meshed with said first output gear, a third speed gear supported on said first countershaft and meshed with said second output gear, and a fourth speed gear supported on said second countershaft and meshed with said second output gear;
a first shift clutch operable for releasable coupling said first and third speed gears to said first countershaft;
a second shift clutch operable for releasably coupling said second and fourth speed gears to said second countershaft;
a first motor/generator connected to said first countershaft;
a second motor/generator connected to said second countershaft; and
a transmission control system for controlling coordinated actuation of said first and second master clutches, said first and second shift clutches and said first and second motor/generators to cause powershift sequential gear shifts, such that when one of said first and second countershafts is released from driven connection with said input shaft, said motor/generator associated- with the released one of said first and second countershafts is actuated to synchronize the rotary speed of the released one of said first and second countershafts with said output shaft.

11. The twin-clutch transmission of claim 10 wherein said first and second master clutches and said first and second shift clutches are power-operated devices controlled by a controller for automatically shifting between a first gear ratio established by said first speed gear, a second gear ratio established by said second speed gear, a third gear ratio established by said third speed gear, and a fourth gear ratio established by said fourth speed gear.

12. The twin-clutch transmission of claim 11 wherein said first and second shift clutches are electrically-actuated dog clutches.

13. The twin-clutch transmission of claim 11 wherein said first and second master clutches are electrically-actuated by first and second electromagnetic solenoids controlled by said controller.

14. The twin-clutch transmission of claim 11 wherein first motor-generator has a first rotor adapted to drive or be driven by said first countershaft, said second motor/generator has a second rotor adapted to drive or be driven by said second countershaft, whereby when said first countershaft is released from driven connection with said input shaft and said first shift clutch is disengage, said first motor/generator is actuated to synchronize the rotary speed of said first countershaft to that of said first speed gear driven by said output gear.

15. The twin-clutch transmission of claim 11 wherein said first master clutch includes a drum rotatably supported on said first countershaft, a hub fixed to said first countershaft, a clutch pack disposed between said drum and said hub, and a spring-biased apply plate normally exerting a clutch engagement force on said clutch pack for frictionally coupling said hub for rotation with said drum, and an electric actuator controlled by said controller which is operable to release said apply plate from engagement with said clutch pack.

16. The twin-clutch transmission of claim 15 further comprising a drive gear fixed to said input shaft which is meshed with a transfer gear fixed to said drum.

17. The twin-clutch transmission of claim 11 further comprising a flywheel unit interconnecting the engine to said input shaft, and third motor/generator connected to said flywheel unit for starting the engine.

* * * * *